United States Patent
Pattnaik et al.

(10) Patent No.: US 11,887,593 B2
(45) Date of Patent: Jan. 30, 2024

(54) NETWORK NODES AND METHODS PERFORMED THEREIN FOR HANDLING MEDIA CHANNELS DURING AN ONGOING MEDIA SESSION

(71) Applicant: Telefonaktiebolaget LM Ericsson (publ), Stockholm (SE)

(72) Inventors: Debashish Pattnaik, Shanghai (CN); Erqun Sun, Shanghai (CN); Charles Hegarty, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 17/433,679

(22) PCT Filed: Mar. 21, 2019

(86) PCT No.: PCT/CN2019/078979
§ 371 (c)(1),
(2) Date: Aug. 25, 2021

(87) PCT Pub. No.: WO2020/186499
PCT Pub. Date: Sep. 24, 2020

(65) Prior Publication Data
US 2022/0051674 A1 Feb. 17, 2022

(51) Int. Cl.
*G10L 15/22* (2006.01)
*G10L 15/02* (2006.01)
(Continued)

(52) U.S. Cl.
CPC ............ *G10L 15/22* (2013.01); *G10L 15/02* (2013.01); *H04L 67/14* (2013.01); *H04L 67/53* (2022.05); *G10L 2015/223* (2013.01)

(58) Field of Classification Search
CPC ... G10L 15/22; G10L 15/02; G10L 2015/223; H04L 67/53; H04L 67/14
(Continued)

(56) References Cited

U.S. PATENT DOCUMENTS

2010/0146063 A1* 6/2010 Lidin .................. H04L 65/1069
709/227
2011/0019104 A1 1/2011 Kwak et al.
(Continued)

FOREIGN PATENT DOCUMENTS

CN 102388642 A 3/2012
CN 103229430 A 7/2013
(Continued)

OTHER PUBLICATIONS

Zhang, Xianqiu , et al., "Key Technologies for Build Enterprise VOIP", Software Guide; vol. 8 No. 2, Feb. 2009, 1-3; English Translation included.

*Primary Examiner* — Susan I McFadden
(74) *Attorney, Agent, or Firm* — Murphy, Bilak & Homiller, PLLC

(57) ABSTRACT

Embodiments herein relate to a method performed by a first network node (140) in a wireless communications network (100), for handling media channels during an ongoing media session. The ongoing media session is a session comprising a first UE (120), a second UE (121) and the first network node (140). The first network node (140) obtains, from the first UE (120), a voice instruction comprising a keyword for invoking a third party service within the media session. The first network node (140) further detects the keyword for invoking the third party service within the media session. The first network node (140) modifies, based on the detection of the keyword, a media channel between the first network node (140) and the second UE (121) to be silent. The first network node (140) further modifies, based on the
(Continued)

detection of the keyword, a media channel between the first network node (140) and a third party network device (150) to be unsilent. Embodiments herein further relate to a method performed by the second network node (141). The second network node obtains, from the first network node (140), an indication that one or more services are requested from the third party network device (150). The second network node further provides, to the first network node (140), a request to modify the media channel for the second UE (121) to be silent.

13 Claims, 16 Drawing Sheets

(51) Int. Cl.
*H04L 67/14* (2022.01)
*H04L 67/53* (2022.01)

(58) Field of Classification Search
USPC .................................................... 704/275
See application file for complete search history.

(56) References Cited

U.S. PATENT DOCUMENTS

| | | |
|---|---|---|
| 2013/0021990 A1 | 1/2013 | Roessel et al. |
| 2013/0225152 A1 | 8/2013 | Matthews et al. |
| 2014/0211675 A1 | 7/2014 | Skog et al. |
| 2017/0163367 A1 | 6/2017 | Tsai et al. |
| 2018/0124238 A1 | 5/2018 | Shah et al. |
| 2018/0366118 A1 | 12/2018 | Lovitt et al. |

FOREIGN PATENT DOCUMENTS

| | | |
|---|---|---|
| CN | 104012151 A | 8/2014 |
| CN | 104956720 A | 9/2015 |
| CN | 105309026 A | 2/2016 |
| CN | 105723771 A | 6/2016 |
| CN | 106465074 A | 2/2017 |
| CN | 108289311 A | 7/2018 |
| WO | 20180680961 A1 | 4/2018 |

\* cited by examiner

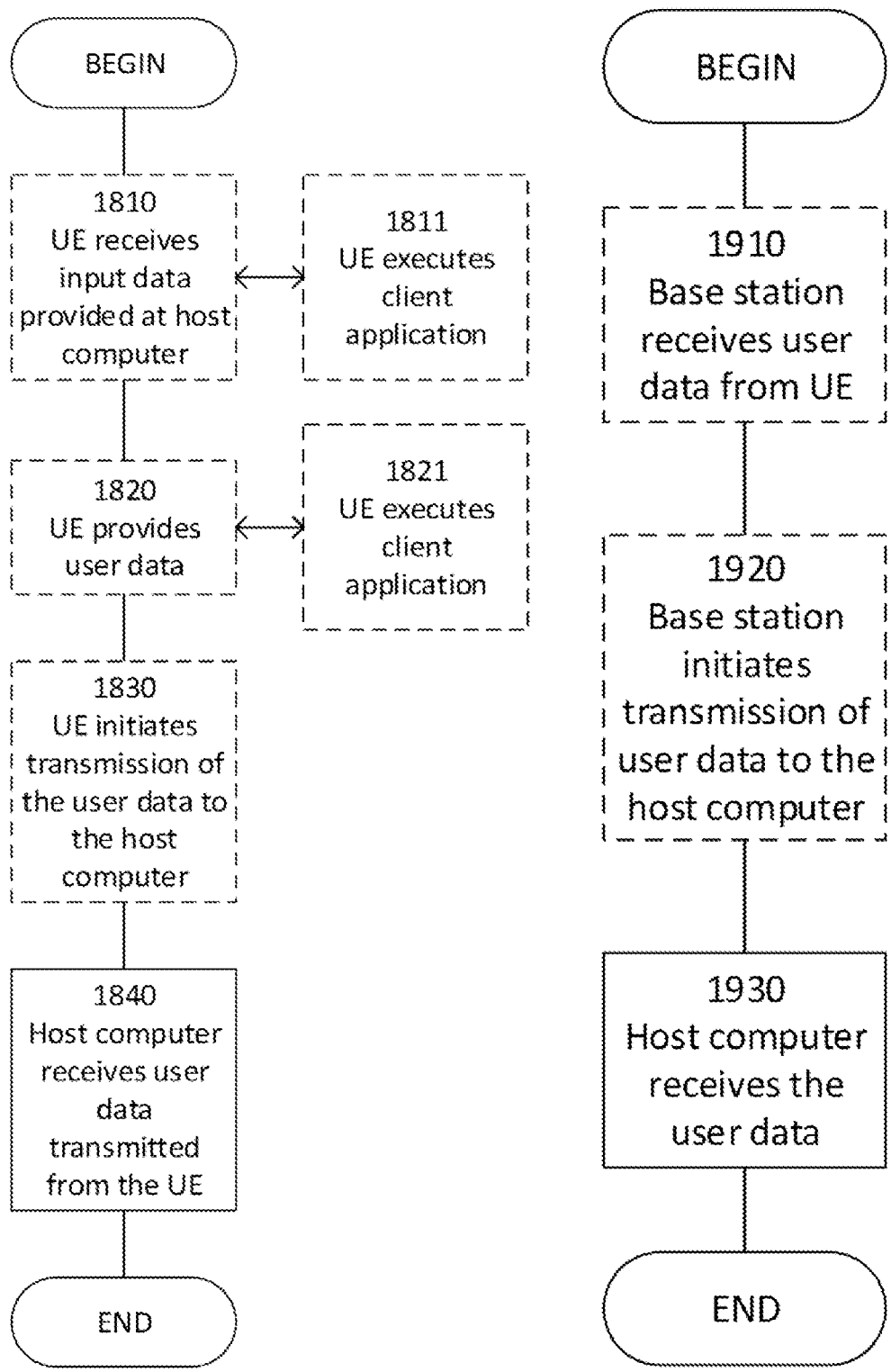

NETWORK NODES AND METHODS PERFORMED THEREIN FOR HANDLING MEDIA CHANNELS DURING AN ONGOING MEDIA SESSION

TECHNICAL FIELD

Embodiments herein relate to network nodes and methods performed therein for handling media channels during an ongoing media session.

BACKGROUND

Over-The-Top (OTT) services have been introduced in wireless communication networks allowing a third party telecommunications service provider to provide services that are delivered across an IP network. The IP network may e.g. be a public internet or cloud services delivered via a third party access network, as opposed to a carrier's own access network. OTT may refer to a variety of services including communications, such as e.g. voice and/or messaging, content, such as e.g. TV and/or music, and cloud-based offerings, such as e.g. computing and storage.

Traditional communication networks such as e.g. IMS Networks are based on explicit SIP signaling methods. The IMS network typically requires a user to invoke various communication services by using a keypad and/or screen of a smart device. A further OTT service is a Digital Assistant (DA). The DA may perform tasks or services upon request from a user. The DA may be implemented in several ways. A first way is commonly referred to as an operator controlled DA. The operator controls the whole DA solution without the UE being impacted. A user of the UE may provide instructions, such as e.g. voice commands, to a core network node, such as e.g. an IMS node, of the operator. The voice command may e.g. be "Digital Assistant, I want a pizza", "Digital Assistant, tell me how many devices are active right now", "Digital Assistant, set-up a conference", or "Digital Assistant, how much credit do I have?". The core network node may detect a hot word, which may also be referred to as a key word, indicating that the user is providing instructions to the DA and may forward the instructions to a network node controlled by a third party service provider, the network node may e.g. comprise a DA platform. The DA platform may e.g. be a bot of a company providing a certain service, such as e.g. a taxi service or a food delivery service. The instructions may be forwarded to the DA platform using e.g. a Session Initiation Protocol/Real-time Transport Protocol (SIP/RTP). The DA platform may comprise certain functionality, such as e.g. Speech2Text, Identification of Intents & Entities and Control & Dispatch of Intents. The DA platform may then forward the instructions to a further network node, which may e.g. be an Application Server (AS) node, which has access to the core network node via a Service Exposure Application Programming Interface (API). Thereby the DA may access the IMS node and perform services towards the core network node. The DA platform is often required to pay a fee to the operator in order to be reachable by the operator's DA users. The user may also be required to pay fees to the operator and network provider for the usage of DA services. The operator may further be required to pay fees to the network provider for every transaction performed via the Service Exposure API.

A further way to implement the DA may be to provide the user with direct access to the network node controlled by the third party service provider comprising the DA platform. This may e.g. be done using a dedicated UE having access to the first network node. This way of implementing the DA is commonly referred to as an OTT-controlled DA. One of the services that can be invoked may e.g. be a telephony services or bot, implemented by the operator.

However, when such a telephony or bot service is invoked during e.g. a call session, the participants in the call session may be exposed to the third party service provider, which proposes a security risk since private information shared between the participants may be accessed by the third party service provider during the call session.

SUMMARY

It is an object of the embodiments herein to provide a secure and efficient method to invoke cloud-based third party AI applications "in-call", i.e. during a call session. In particular by providing a Digital-Assistant based Application-Server and framework that can invoke voice-based instruction services to the served user thereby enabling the user to invoke various communication services, reserve and control media resources based on voice instructions, while providing a secure media channel wherein the voice instructions of the served user is secured and not exposed to other participants and voice from other participants is secured and not exposed to the third party service provider.

According to a first aspect of the embodiments herein the object is achieved by a method performed by a first network node in a wireless communications network, for handling media channels during an ongoing media session. The ongoing media session is a session comprising a first UE, a second UE and the first network node. The first network node obtains, from the first UE, a voice instruction comprising a keyword for invoking a third party service within the media session. The first network node detects the keyword for invoking the third party service within the media session. The first network node modifies, based on the detection of the keyword, a media channel between the first network node and the second UE to be silent. The first network node further modifies, based on the detection of the keyword, a media channel between the first network node and a third party network device to be unsilent.

According to a second aspect of the embodiments herein the object is achieved by a method performed by a second network node in a wireless communications network, for handling media channels during an ongoing media session. The ongoing media session is a session comprising a first UE, a second UE and the first network node: The second network node obtains an indication that one or more services are requested from the third party network device, from the first network node. The second network node provides, to the first network node, a request to modify the media channel for the second UE to be silent.

According to a third aspect of the embodiments herein the object is achieved by a first network node in a wireless communications network, for handling media channels during an ongoing media session. The ongoing media session is a session comprising a first UE, a second UE and the first network node. The first network node is configured to obtain, from the first UE, a voice instruction comprising a keyword for invoking a third party service within the media session. The first network node is configured to detect the keyword for invoking the third party service within the media session. The first network node is configured to modify, based on the detection of the keyword, a media channel between the first network node and the second UE to be silent. The first network node is configured to modify, based on the detection of the keyword, a media channel between the first network node and a third party network device to be unsilent.

According to a fourth aspect of the embodiments herein the object is achieved by a second network node in a wireless communications network, for handling media channels during an ongoing media session. The ongoing media session is a session comprising a first UE, a second UE and the first network node. The second network node is configured to obtain, from the first network node, an indication that one or more services are requested from the third party network device. The second network node is further configured to provide, to the first network node, a request to modify the media channel for the second UE to be silent.

According to a fifth aspect of the embodiments herein the object is achieved by a computer program product comprising instructions, which when executed by at least one processor, causes the at least one processor to perform the method according to the first aspect of embodiments herein.

According to a sixth aspect of the embodiments herein the object is achieved by a carrier comprising the computer program product according to the third aspect of embodiments herein, wherein the carrier is one of an electronic signal, an optical signal, an electromagnetic signal, a magnetic signal, an electric signal, a radio signal, a microwave signal, or a computer-readable storage medium.

The proposed solution provides a secure media channel wherein the voice instructions of the user are secured and not exposed to other participants, such as e.g. third party services. By muting the media channel to the second user when the media channel to the third party service is active and unsilent and muting the media channel to the third party service when the media channel to the second user is active and unsilent, it is ensured that the customer context, such as e.g. the voice of the user, remains in the Mobile Network Operators (MNOs) network whilst enhancing customer's insight and control of the services. Security and privacy is ensured as the service provided by the trusted operator entity of the first and second network nodes ensures no sharing of information to the OTT application i.e. User communication usage, behavior and/or patterns is not exposed to third parties.

BRIEF DESCRIPTION OF THE DRAWINGS

The embodiments herein will now be described and explained in more detail in relation to the enclosed drawings, in which:

FIG. 17 is a flowchart depicting methods implemented in a communication system including a host computer, a base station and a user equipment in accordance with some embodiments;

FIG. 18 is a flowchart depicting methods implemented in a communication system including a host computer, a base station and a user equipment in accordance with some embodiments.

DETAILED DESCRIPTION

Figure 1:
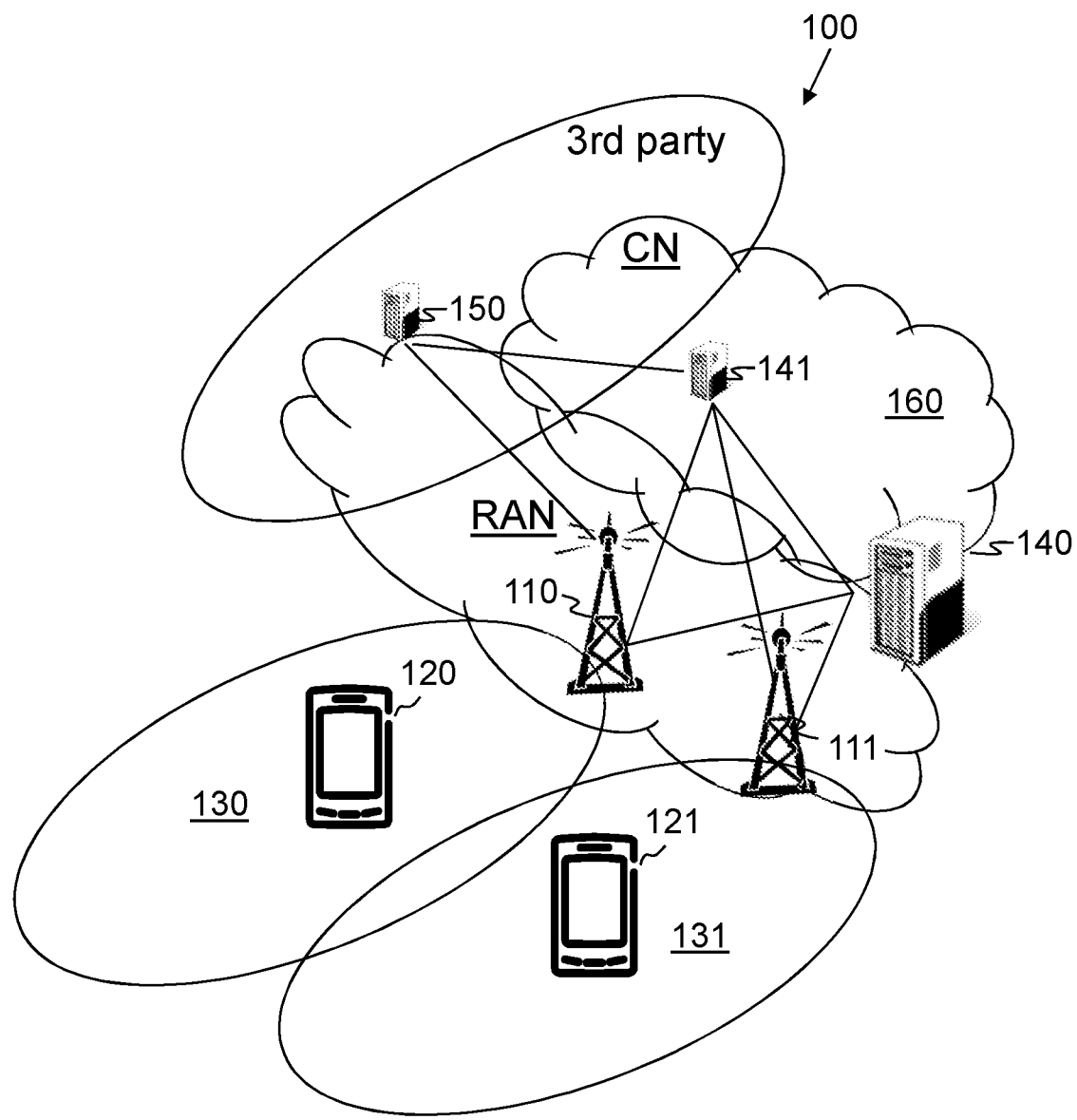
FIG. 1 is a schematic overview depicting a wireless communications network.

FIG. 1 depicts an example of a communications network 100 according to a first scenario in which embodiments herein may be implemented. The communications network 100 is a wireless communication network such as e.g. a 5G, LTE, E-Utran, WCDMA, GSM network, any 3GPP cellular network, Wimax, or any cellular network or system.

The communications network 100 comprises a RAN and a CN. The communication network 100 may use any of a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), or Wi-Fi, just to mention a few possible implementations. In the communication network 100, one or more UEs 120, 121 may communicate via one or more Access Networks (AN), e.g. RAN, with one or more CNs. The UE 120 may e.g. be a wireless device (WD), a mobile station, a non-access point (non-AP) STA, a STA, a Digital Assistant (DA) and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, including the two shown radio network nodes 110, 111 each providing radio coverage over one or more geographical areas, such as a cell 130, 131, using a radio access technology (RAT), such as 5G, LTE, UMTS, Wi-Fi or similar. The radio network node 110, 111 may be a radio access network node such as a radio network controller or an access point such as a wireless local area network (WLAN) access point or an Access Point Station (AP STA), an access controller, a base station, e.g. a radio base station such as a gNB, NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the radio access technology and terminology used.

The CN further comprises one or more core network nodes 140, 141 which is configured to communicate with the radio network nodes 110, 111, via e.g. an S1 interface. The core network node may e.g. be a 5G core (5GC) node, an IMS node, a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may be connected to a network node 141 located in a same operator domain as the first core network node 140, wherein the network node 141 may act as a gateway to a network node 150 located in a $3^{rd}$ party domain of the communications network 100. The core network node 140 and the network nodes 150, 151 may be collocated nodes, stand-alone nodes or distributed nodes comprised in a cloud 160.

The UE 120 is located in the cell 130 of the network node 110, which is referred to as the serving cell, whereas the cell 131 of the network node 111 is referred to as a neighboring cell. Although, the network node 110 in FIG. 1 is only depicted providing radio coverage in a serving cell 130, the same network node 110 may further provide radio coverage in one or more neighboring cells 131 in addition to the serving cell 130.

The UE 120 may further be configured to communicate over a plurality of different RATs, such as 5G, LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

Figure 2:
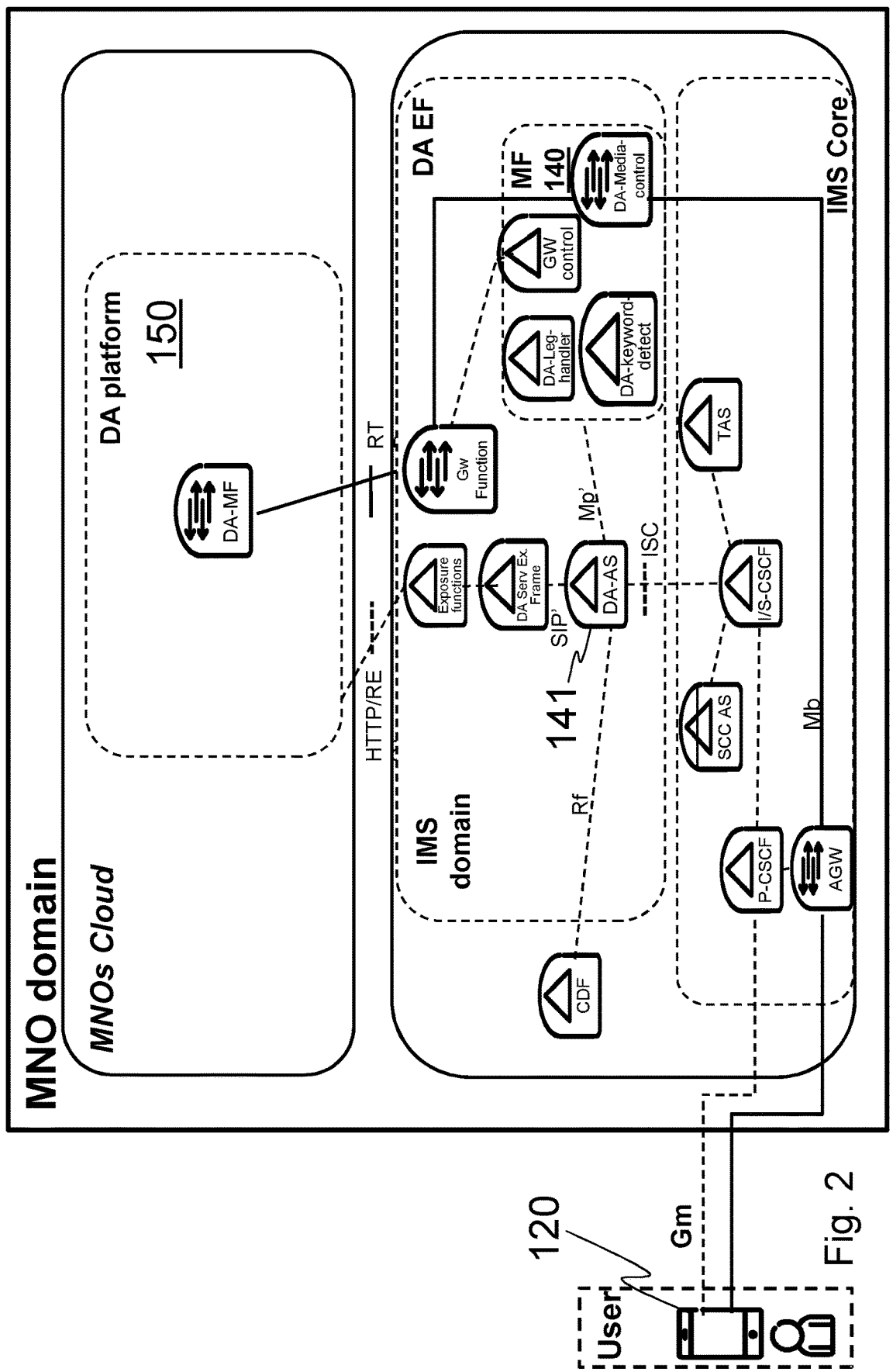
FIG. 2 is a schematic overview depicting a communications network comprising a third party service in a Voice Instruction Based Platform.

FIG. 2 shows an overview of a communications network comprising a Digital Assistant (DA) in a Voice Instruction Based Platform. The DA comprises a DA-Application Server (AS), a DA-Media Function (MF), a DA-Keyword-detect function and a DA-leg handler. As depicted in the FIG. 2, the solution proposed by the embodiments herein defines an end to end method/solution of Invoking and Controlling IMS Services and its resources based on Voice Instructions using DAs, also referred to as personal virtual assistants. The DA-AS, the DA-Leg handler and the DA-keyword detect may be located in the an IMS domain of the communications network, while the DA-MF may be located in a third party network or a third party cloud domain. The DA-MF supports a secure Real-time Transport Protocol (RTP) towards the DA service in the IMS domain and towards an end user UE. The DA-AS provides communication services for the DA on behalf of the user. The DA service may be invoked on an IP multimedia Subsystem Service Control Interface (ISC) after a Service Centralization and Continuity (SCC AS) and before a Telephony Application Server (TAS). After and before does herein refer to the location in a signaling path, such as e.g. VoLTE signaling. A SIP interface is provided towards a DA Ex-framework function, SIP requests may be initiated from the DA exposure framework on behalf of the DA platform. A media control interface is provided for control of a DA leg handling towards the DA-leg-handler function. Accounting information may be provided over an Rf interface. The DA-Leg-handler may provide DA leg handling (conference like) towards the DA platform (DA-MF) and a DA-media-control. On request (keyword) controls switching of media between the DA platform, the DA-media-control and the UE. The DA-media control provides media control functionality, such as e.g. switching media between DA and UE on command from the DA-leg-handler based on the keyword reception. The DA media control may provide a media resource optimized network-based invocation of the external DA functionally.

The DA-Keyword-Detection function provides keyword detection functionality that detects configured keywords from the user. The DA-Keyword-Detection may be provided with a notification interface to the DA-leg-handler.

Figure 3:
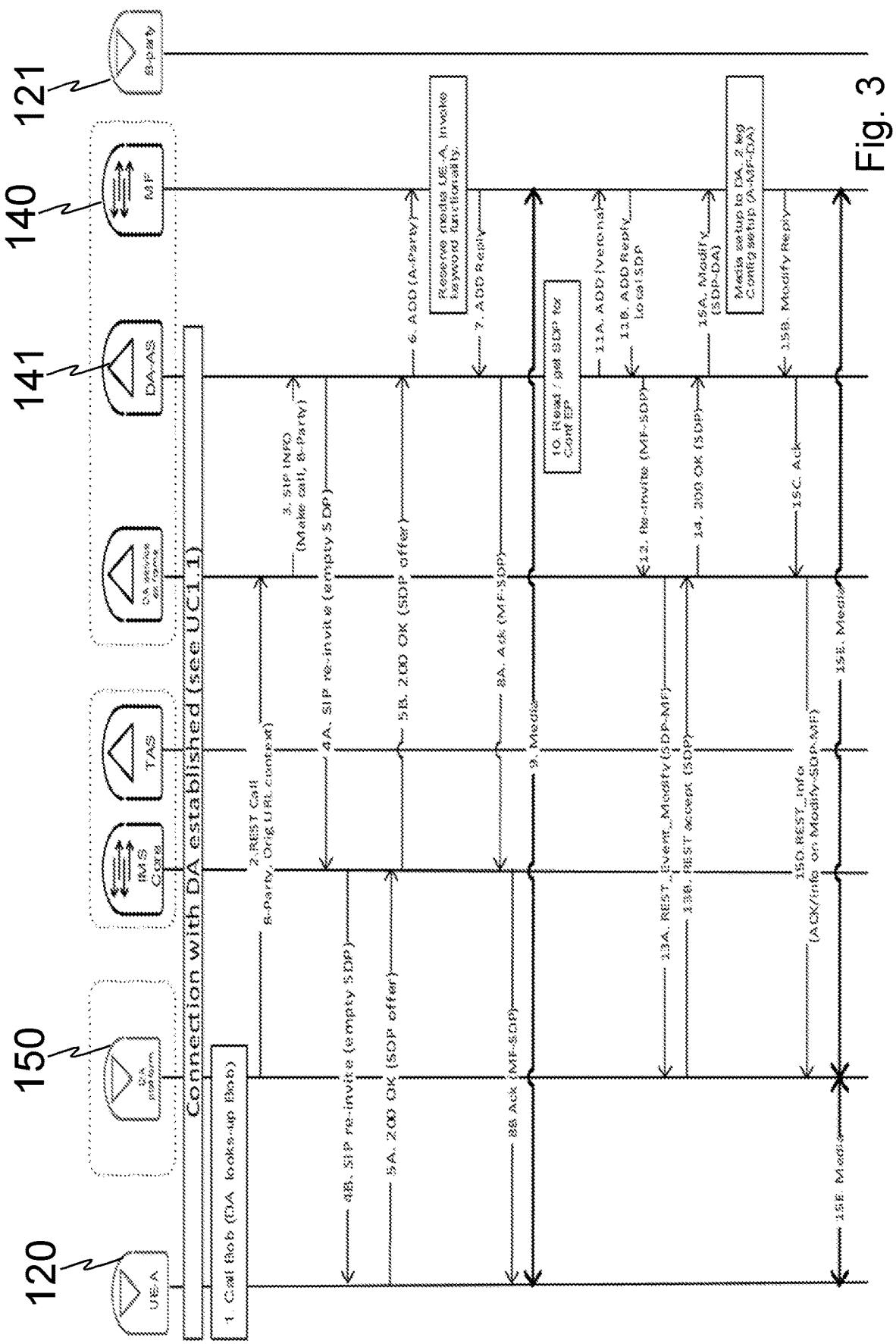
FIG. 3 is a flowchart depicting a some first steps of a method for setting up a call session with a second UE using the third party service in the voice instruction based platform according to embodiments herein; w.

FIG. 3 is a signaling diagram illustrating a method for handling voice calls using a third party device, such as the DA, in the communications network 100. In the scenario shown in FIG. 3 a first user, using a first UE (120) requests the DA platform to establish a call with a second user using a second UE (121).

The following steps describe how the user may setup a voice instruction-based voice call session with another user.

Action 1: The first UE 120 may already have invoked a voice instruction service, using the third party device. Using voice instruction, the user of the first UE 120, which may also be referred to as a calling UE, may initiate a call with a user of the second UE 121, which may also be referred to as a B-Party UE or a receiving UE. For ease of understanding, the user of the second UE 121 is herein referred to as Bob. The voice instruction may be carried over a media channel between the first UE 120 and the DA Platform 150.

Action 2: The DA Platform 150 may translate speech to text function and maps the voice instructions to a text and/or a JavaScript Object Notation (Json) format. From a perspective of the IMS DA the service DA Platform 150 may act as a WebRTC client. The translated text may then be forwarded to the DA Service Ex Frame node e.g. via an HTTP/REST API. The DA Service Ex Frame node may e.g. be implemented as a DA Service Ex Frame function comprised in a core network node, such as e.g. the IMS node.

Action 3: The DA Service Ex Frame node may send a Session Initiation Protocol (SIP) INFO message comprising a B-Party number, such as e.g. a telephone number, instructing the DA-AS 141 to trigger a voice call to the B-Party specified by the number.

Action 4A: The DA-AS 141 may send an empty SIP INVITE request to the IMS core of the IMS node. This empty SIP INVITE does not contain a Session Description Protocol (SDP) body.

Action 4B: The IMS core may forward the empty SIP INVITE to the calling UE, in this case the first UE 120, and may request it to send SDP details.

Action 5A: The calling UE may respond to the request coming from the IMS Core with a SIP 200OK response comprising its own offered SDP media attributes.

Action 5B: The IMS Core may forward the SIP 200OK response including the SDP offer to the DA-AS 141.

Action 6: The DA-AS 141 may reserve a media resource in the MF node 140. The MF node 140 may handle the keyword detection function, the DA-media control, the DA-leg handler and the Gateway Control functions comprised in the MF node 140.

Action 7: The MF node 140 may invoke the keyword detection feature, reserve media channel resources and may respond with an ADD reply to the DA-AS 141.

Action 8A: The DA-AS 141 may forward a SIP ACK message with SDP answer to the IMS core.

Action 8B: The IMS core may forward the SIP ACK comprising the SDP answer to the calling UE.

Action 9: A Media channel between the calling UE and the Media Function node may be established.

Action 10: The DA-AS 141 may prepare configurations to include the DA-Platform to the current conference session which is between the UE-A and the MF node 140.

Action 11A: The DA-AS 141 may trigger an ADD requests for the reservation of media resource to the MF node 140.

Action 11B: The MF node 140 may reserve the media resource locally and responds with an ADD reply with the local SDP as its body.

Action 12: The DA-AS 141 may trigger a SIP RE-INVITE to the DA-Service Ex. Frame node. This RE-INVITE may comprise the local SDP which it received from the MF node 140.

Action 13A: The DA-Service Ex. Frame node may trigger a REST/HTTP event towards the DA-Platform 150. The REST message may comprise the SDP that it has received from the DA-AS.

Action 13B: The DA-Platform 150 may respond with the REST/HTTP 200OK comprising its own supported SDP attributes towards the DA-Service Ex. Frame node.

Action 14: The DA-Service Ex. Frame node may send a SIP 200OK response including the SDP of the DA-Platform to the DA-AS 141.

Action 15A: The DA-AS 141 may request for the modification of the media channel in MF Node 140 as per the remote SDP it received from DA-Service Ex. Frame node.

Action 15B: The MF Node 140 may update the media channel and may send a Modify response message to the DA-AS 141 comprising the updated SDP body.

Action 15C: The DA-AS 141 may complete the SIP dialogue with a SIP ACK message including the updated SDP body to the DA-Service Ex. Frame node.

Action 15D: The DA-Service Ex. Frame node may trigger a REST/HTTP based message comprising the updated SDP body towards the DA-Platform.

Action 15E: The Media channel may successfully be established between the UE and DA-Platform and between the DA-Platform 150 and the MF node 140.

Figure 4:
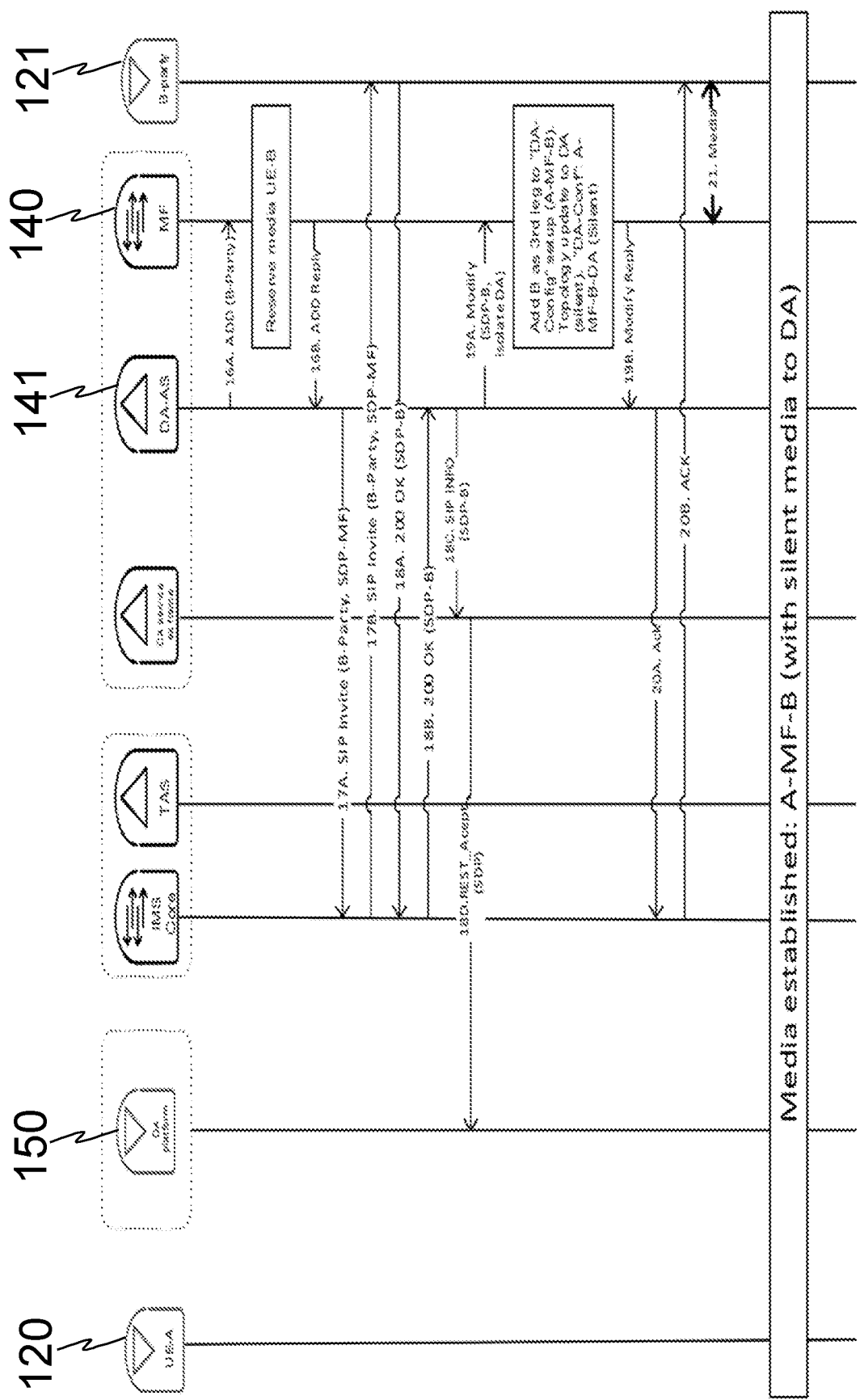
FIG. 4 is a flowchart depicting some second steps of the method for setting up a call session with a second UE using the third party service in the voice instruction based platform according to embodiments herein.

FIG. 4 discloses the first UE 121 requesting the DA platform to establish a media session with the User-B. The sequence depicted in FIG. 4 is the continuation of the sequence depicted in FIG. 5.

Action 16A: The DA-AS 141 may send an ADD request to the MF node 140 and requests to reserve a media resource for the B-Party user.

Action 16B: The MF node 140 may reserve the media resources for the B-Party and responds with an ADD reply including its local SDP.

Action 17A: The DA-AS 141 may trigger an SIP INVITE request towards the IMS core comprising the B-Party information and the SDP received from the MF node 140.

Action 17B: The IMS core may send the SIP INVITE request along with the SDP offer to the B-Party user.

Action 18A: The UE 121 of the B-Party user may respond with a SIP 200OK response including its own SDP as an answer back to the IMS Core.

Action 18B: The IMS Core may forward the SIP 200OK along with the SDP of the B-Party to the DA-AS 141.

Action 18C: The DA-AS 141 may inform the DA-Service Ex. Frame node about the supported SDP attributes of the UE 121 of the B-Party user with a SIP INFO request.

Action 18D: The DA-Service Ex. Frame node may forward the SDP attributes towards the DA Platform 150 using a REST/HTTP Accept message.

Action 19A: The DA-AS 141 may send a Modify request to the MF node 140 requesting the media channel to be updated as per the remote SDP received from the IMS Core in Step 18B.

Action 19B: On receiving the Modify request in Step 19A, the MF node 140 may add the B-Party to the current conference session which was updated in Step 15E shown in FIG. 3. The MF node 140 updates the topology and sets the media channel going towards the DA-Platform to Silent and then sends a Modify reply to the DA-AS.

Action 20A: The DA-AS 141 may inform the IMS core about the successful update of the Media channel and also completes the SIP dialogue to the IMS Core with a SIP ACK message.

Action 20B: The IMS Core may forwards the SIP ACK to the UE 121 of the B-Party user and establishes the signaling connection.

Action 21: The Media channel between MF node 140 and the UE 121 of the B-Party user may be established.

Finally an End-to-End (E2E) media channel between the first UE 120, the MF node and the second UE 121 of the B-Party user gets established and the media channel between the MF node 140 and the DA Platform 150 is put into silence mode, which may also be referred to as being silenced or being muted. The MF-DA channel is silent, i.e. the DA cannot hear/listen in until it is triggered by a keyword provided by the user of the first UE 120.

Figure 5:
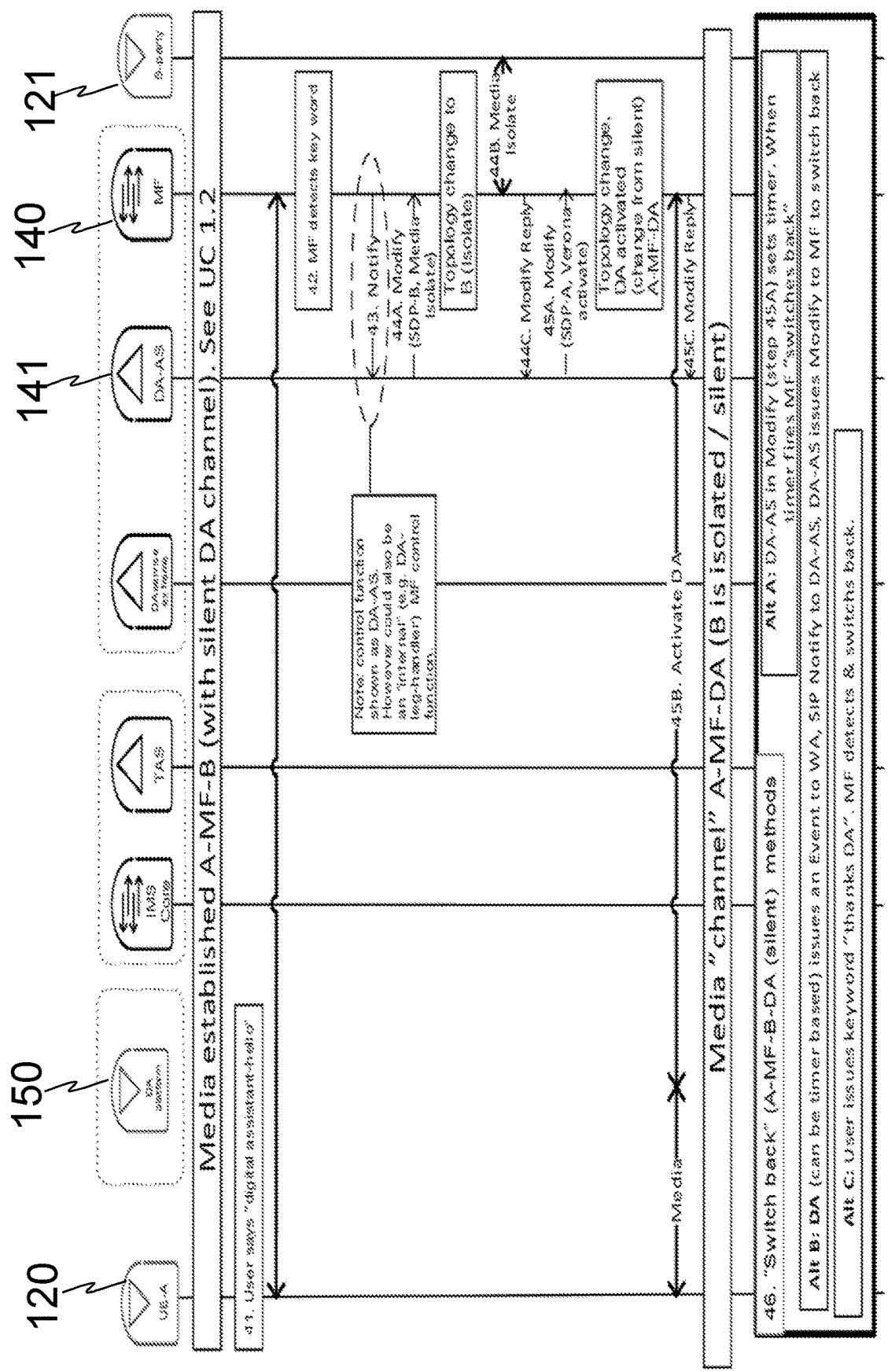
FIG. 5 is a flowchart depicting a method for securing media of a user invoking a third party voice instruction service during an ongoing call session according to embodiments herein.

FIG. 5 shows a method for securing media of a user invoking the third party voice instruction service during an ongoing call session according to some embodiments herein. In the following, the steps performed by the first node 140, which in this particular embodiment is a MF node, for detecting a keyword provided by the user of a first UE 120 for invoking a third party service during an ongoing session are disclosed.

Action 41: Initially a media session is already be established between the first UE 120, the MF node 140 and the second UE 121 of the B-Party user as depicted in FIG. 4. During the conference session, the first UE 120, or the user of the first UE 120 instructs the DA platform to detect the voice instruction keyword and invoke the requested service by saying "Digital Assistant Hello". This voice instruction flows over the media channel and ends at the MF node 140.

Action 42: The Keyword detection feature in the MF node 140 detects the keyword, such as e.g. "Digital Assistant".

Action 43: On detecting the keyword, the MF node 140 notifies the DA-AS 141 about the incoming voice instruction request from the first UE 120.

Action 44A: The DA-AS 141 sends a Modify request to the MF node 140 to update the media channel for UE 121 of the B-Party user so that user-B is isolated and doesn't get disturbed with the voice instructions coming in from the first UE 120. Updating the media channel for a UE so that the user of the UE is isolated may herein also be referred to as muting or silencing the media channel between the MF node 140 and the second UE 121.

Action 44B: The MF node 140 may isolate, which may also be referred to as silence the media on an active media channel, the second UE 121 of the B-Party user and sets the media channel towards the B-Party to silent. When the channel is silent it is still active but no information can be seen, heard or sent on the channel.

Action 44C: After setting the B-party media channel on hold, the MF node 140 may inform this to the DA-AS 141 with a Modify Reply message.

Action 45A: The DA-AS 141 sends a new Modify request to the MF node 140 requesting the MF node 140 to activate the media channel between the MF node 140 and the DA Platform 150 to be activated. The DA-AS 141 may further set a timer, wherein the timer indicates the duration of the media channel between the MF node 140 and the DA Platform 150 being activate. The timer may be comprised in the Modify request sent to the MF node 140.

Action 45B: The media channel between the DA Platform 150 and the MF node 140 is activated. Now the DA Platform 150 may receive voice/media from the first UE 120 and/or the MF node 140.

Action 45C: After the media channel activation is done, the MF node 140 may inform this to the DA-AS 141 with a Modify Response message.

Thereby the voice instructions coming from the first UE 120 may be received by the DA Platform 150. The B-Party media channel, i.e. the media channel to the second UE 121 is isolated and hence it won't be able to hear any voice instruction from the first UE 120 intended for the DA Platform 150.

Action 46: When the services from the DA platform are no longer required, the media channel between the MF node 140 and the DA Platform 150 may be deactivated and/or silenced and the media channel between the MF node 140 and the second UE 121 may be unsilenced, which may also be referred to as being unmuted.

According to a first embodiment this may be performed by the MF node 140 when the timer set by the DA-AS 141 in action 45A expires.

According to a second embodiment the DA platform 150 may, e.g. timer based, issue an Event to an Exposure Function (EF), a SIP Notify message to the DA-AS, the DA-AS may issue a Modify request to the MF node 140 to switch back to an unsilent media channel to the second UE 121 and a silent and/or deactivated media channel to the DA platform 150. The exposure function may also be referred to as a Web Access (WA).

According to a third embodiment the user of the first UE 120 may issue a keyword such as e.g. "thanks DA", which the MF node 140 detects and switches back to an unsilenced media channel to the second UE 121 and a silenced media channel to the DA platform 150.

The DA-AS 141 and the framework thus ensures a secure media channel wherein the voice instructions of the user is secured and not exposed to other participants. The embodiments herein provide the DA-AS 141 adapted to invoke voice-based instruction service to the served user and to provide a media channel to the user. The DA-AS 141 and the framework ensure that the user can use the media channel to initiate voice-based instructions to invoke various communication services. The DA-AS 141 may activate the keyword detection mechanism which ensures the media function can differentiate between voice instructions and normal communication. The DA-AS 141 may also interface towards a third party service, such as an Artificial Intelligence (AI) powered digital voice assistant platform, to avail different AI based services. The DA-AS 141 may further ensure that accounting information for the service requested is sent towards an Accounting Server on an Rf interface.

Some actions performed by the first network node 140 in the wireless communications network 100, for handling media channels during an ongoing media session according to embodiments herein will now be described with reference to a flowchart depicted in FIG. 6. The ongoing media session is a session comprising the first UE 120, a second UE 121 and the first network node 140. The first network node 140 may be a MF node. Actions that should be performed in some embodiments only are marked with dashed boxes.

Action 6010: The first network node 140 obtains, from the first UE 120, a voice instruction comprising a keyword for invoking a third party service within the call session. This action 6010 corresponds to action 303 described with regards to FIG. 3 and action 403 described with regards to FIG. 4.

Action 6020: The first network node 140 detects the keyword for invoking the third party service within the call session.

Action 6030: The first network node 140 may provide, to a second network node 141, an indication that one or more services are requested from the third party network device 150. The second network node 141 may be an Application Server (AS) node providing communication service towards the third party network device 150. The third party network device 150 may e.g. be a digital assistant provided by a third party provider, such as e.g. the DA-MF.

Figure 8:
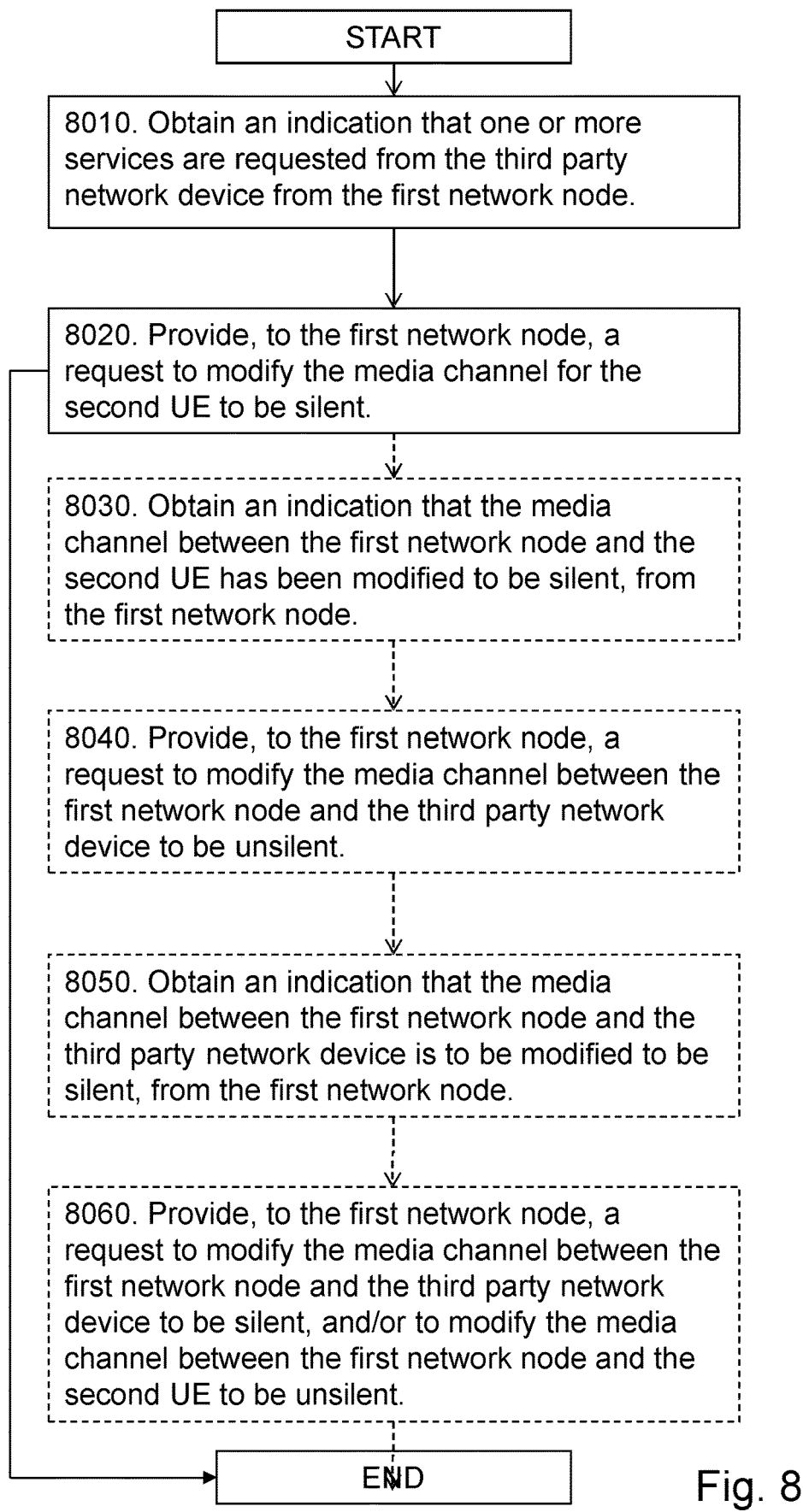
FIG. 8 is a flowchart depicting a method performed by a second network node according to embodiments herein.

This action 6030 corresponds to action 43 described with regards to FIG. 5 and action 8010 described with regards, to FIG. 8.

Action 6040: The first network node 150 may obtain, from the second network node 141, a request to modify the media channel for the second UE 121 to be silent. The request to modify the media channel to be silent may e.g. be obtained in a modify request received from the second network node 141. The modify message may also be used for modifying the media channel to be unsilent.

This action 6040 corresponds to action 44A described with regards to FIG. 5 and action 8020 described with regards to FIG. 8.

Action 6050: The first network node 140 mutes, based on the detection of the keyword, a media channel between the first network node 140 and the second UE 121.

This action 6050 corresponds to action 44B described with regards to FIG. 5.

Action 6060: The first network node 140 may provide, to the second network node 141, an indication that the media channel between the first network node 140 and the second UE 121 has been muted. This action 6060 corresponds to action 44C described with regards to FIG. 5 and action 8030 described with regards to FIG. 8.

Action 6070: The first network node 140 may obtain, from the second network node 141, a request to modify the media channel between the first network node 140 and the third party network device 150 to be unsilent. This action 6070 corresponds to action 45B described with regards to FIG. 5 and action 8040 described with regards to FIG. 8.

Action 6080: The first network node 140 modifies, based on the detection of the keyword, the media channel between the first network node 140 and a third party network device 150 to be unsilent. This action 6080 corresponds to action 45B described with regards to FIG. 5

Action 6090: The first network node 140 may obtain an indication that the media channel between the first network node 140 and the third party network device 150 is to be modified to be silent. This may be performed when the third party service is not required anymore or when the invoked third party service has been executed. This action 6090 is corresponds to action 46 described in relation to FIG. 5.

The indication may e.g. be that the second network node 141 sets a timer in action 6040. When the timer expires the first network node 140 switches back, i.e. modifies the media channel between the first network node 140 and the third party network device 150 to be silent and modifies the media channel between the first network node 140 and the second UE 121 to be unsilent. This example corresponds to action 46 Alt A described in relation to FIG. 5.

The indication may e.g. be that the second network node 141 obtains a request from the third party network device 150, e.g. after a timer has expired in the third party device 150, which is then forwarded to the first network node 140. This example corresponds to action 46 Alt B described in relation to FIG. 5.

The indication may also be a keyword in a voice command from the user of the first UE 120, which may be detected by the first network node 140. This example corresponds to action 46 Alt A described in relation to FIG. 5.

Action 6100: The first network node 140 may provide, to the second network node 141, the indication that the media channel between the first network node 140 and the third party network device 150 is to be modified to be silent.

Action 6110: The first network node 140 may obtain, from the second network node 141, a request to modify the media channel between the first network node 140 and the third party network device 150 to be silent, and/or to modify the media channel 150 between the first network node 140 and the second UE 121 to be unsilent.

Action 6120: The first network node 140 may modify, based on the obtained indication, the media channel between the first network node 140 and the third party network device 150 to be silent.

Action 6130: The first network node 140 may further modify, based on the obtained indication, the media channel between the first network node 140 and the second UE 121 to be unsilent.

Some actions performed by the second network node 151 in the wireless communications network 100, for handling media channels during an ongoing call session, according to embodiments herein will now be described with reference to a flowchart depicted in FIG. 8. The ongoing media session comprises the first UE 120, the second UE 121 and the first network node 140. The first network node 140 may be an MF node. The second network node 141 may be an AS node providing communication service towards the third party network device 150 and the third party network device 150 may be a digital assistant. Actions that should be performed in some embodiments only are marked with dashed boxes.

Action 8010: The second network node 141 obtains an indication that one or more services are requested from the third party network device 150 from the first network node 140.

Figure 6:
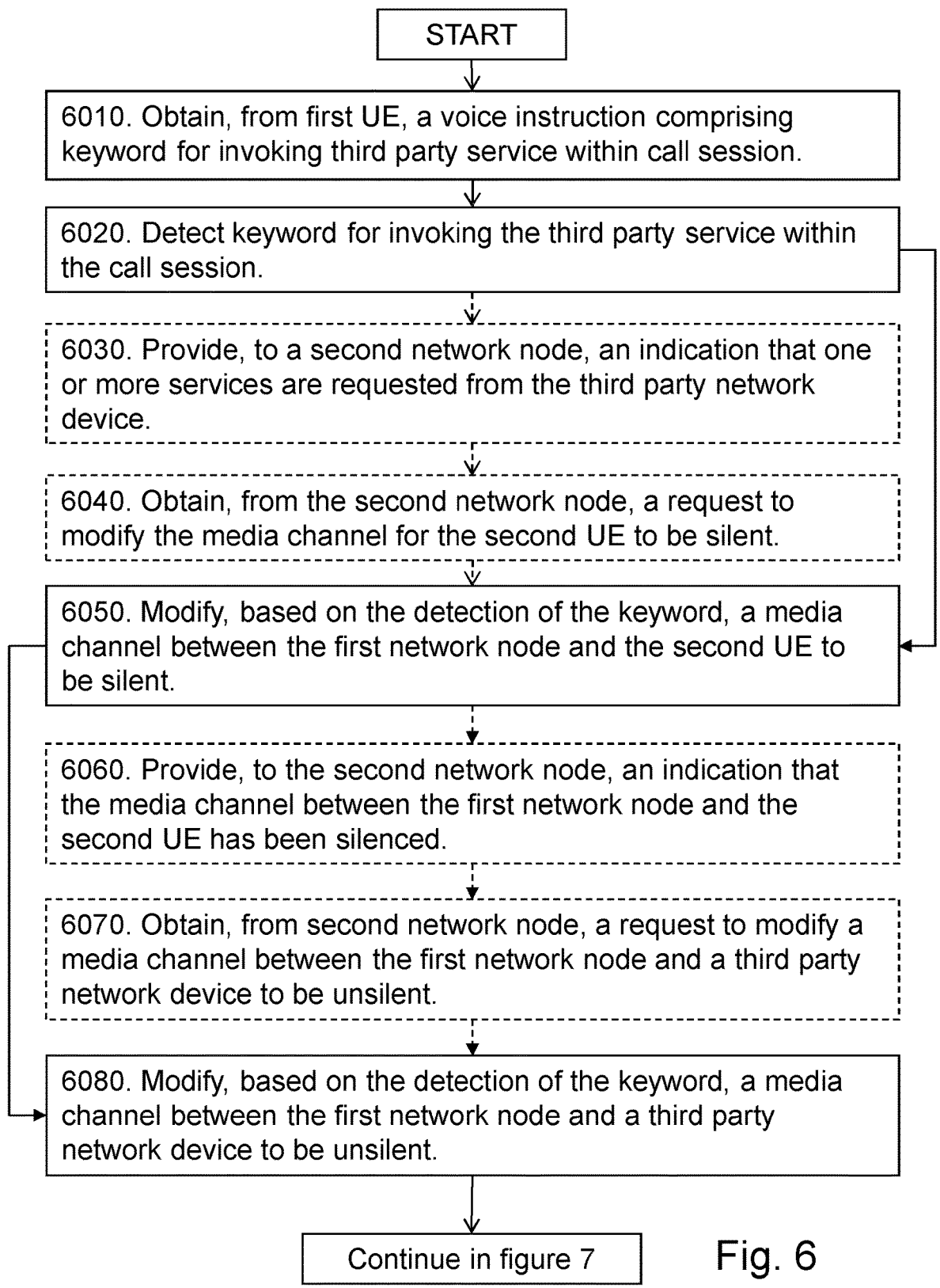
FIG. 6 is a flowchart depicting some first method steps performed by a first network node according to embodiments herein.

This action 8010 corresponds to action 43 described with regards to FIG. 5 and action 6030 described with regards to FIG. 6.

Action 8020: The second network node 141 provides a request to modify the media channel for the second UE 121 to be silent, to the first network node 140.

This action 8020 corresponds to action 44A described with regards to FIG. 5 and action 6040 described with regards to FIG. 6.

Action 8030: The second network node 141 may obtain an indication, such as e.g. a modify reply message, indicating that the media channel between the first network node 140 and the second UE 121 has been muted, from the first network node 140.

This action 8030 corresponds to action 44C described with regards to FIG. 5 and action 6060 described with regards to FIG. 6.

Action 8040: The second network node 141 may provide a request to modify the media channel 150 between the first network node 140 and the third party network device 150 to be unsilent, to the first network node 140.

This action 8040 is similar to action 45A described with regards to FIG. 5 and action 6070 described with regards to FIG. 6.

Action 8050: The second network node 141 may obtain an indication that the media channel between the first network node 140 and the third party network device 150 is to be modified to be silent, from the first network node 140.

Figure 7:
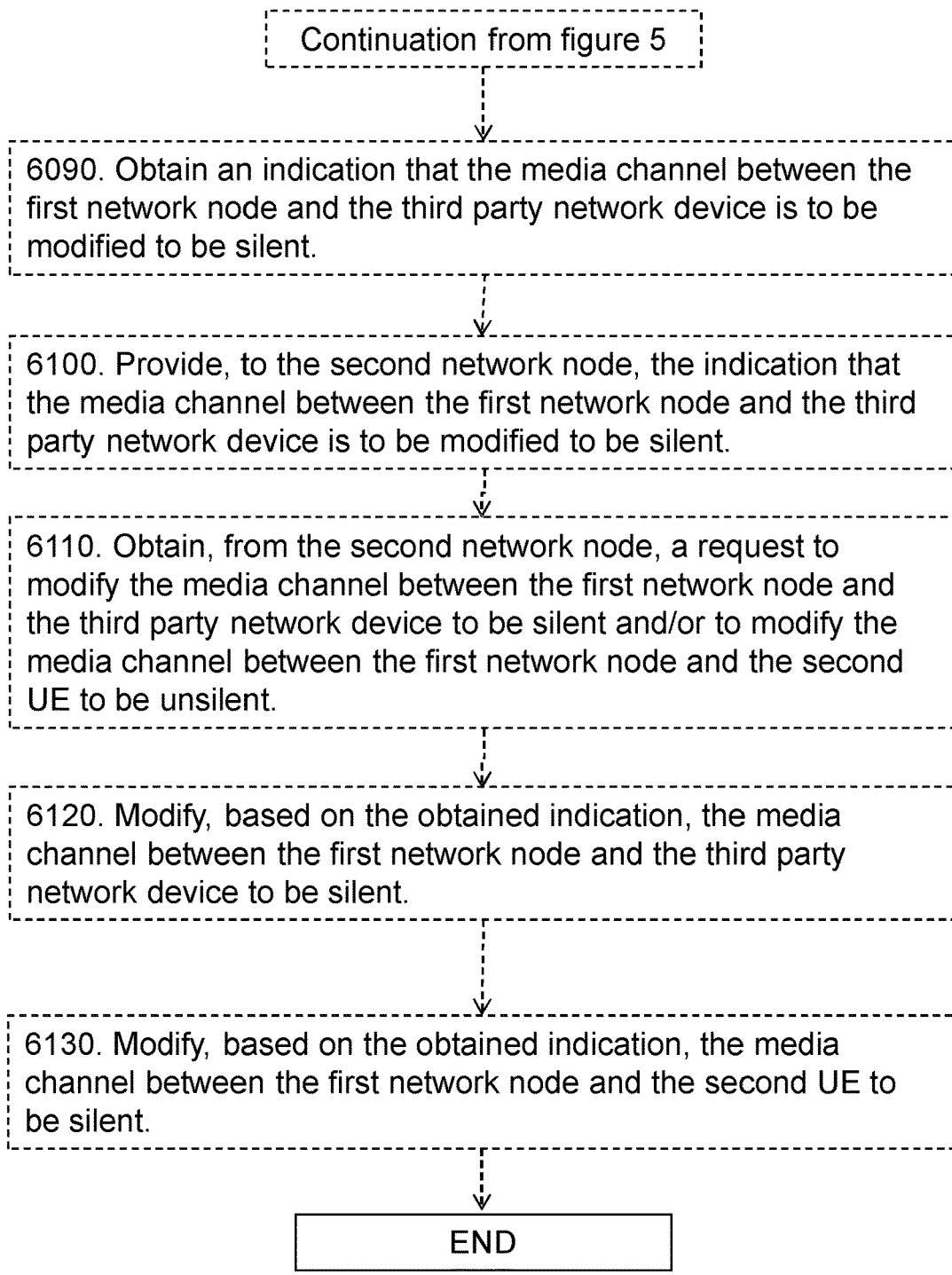
FIG. 7 is a flowchart depicting some second method steps performed by the first network node according to embodiments herein.

This action 8050 corresponds to action 409 described with regards to FIG. 5 and action 6110 described in with regards to FIG. 7.

Action 8060: The second network node 141 may provide a request to modify the media channel between the first network node 140 and the third party network device 150 to be silenced, and/or to modify the media channel 150 between the first network node 140 and the second UE 121, to the first network node 140 to be unsilent.

This action 8060 corresponds to action 410 described with regards to FIG. 4.

Figure 9:
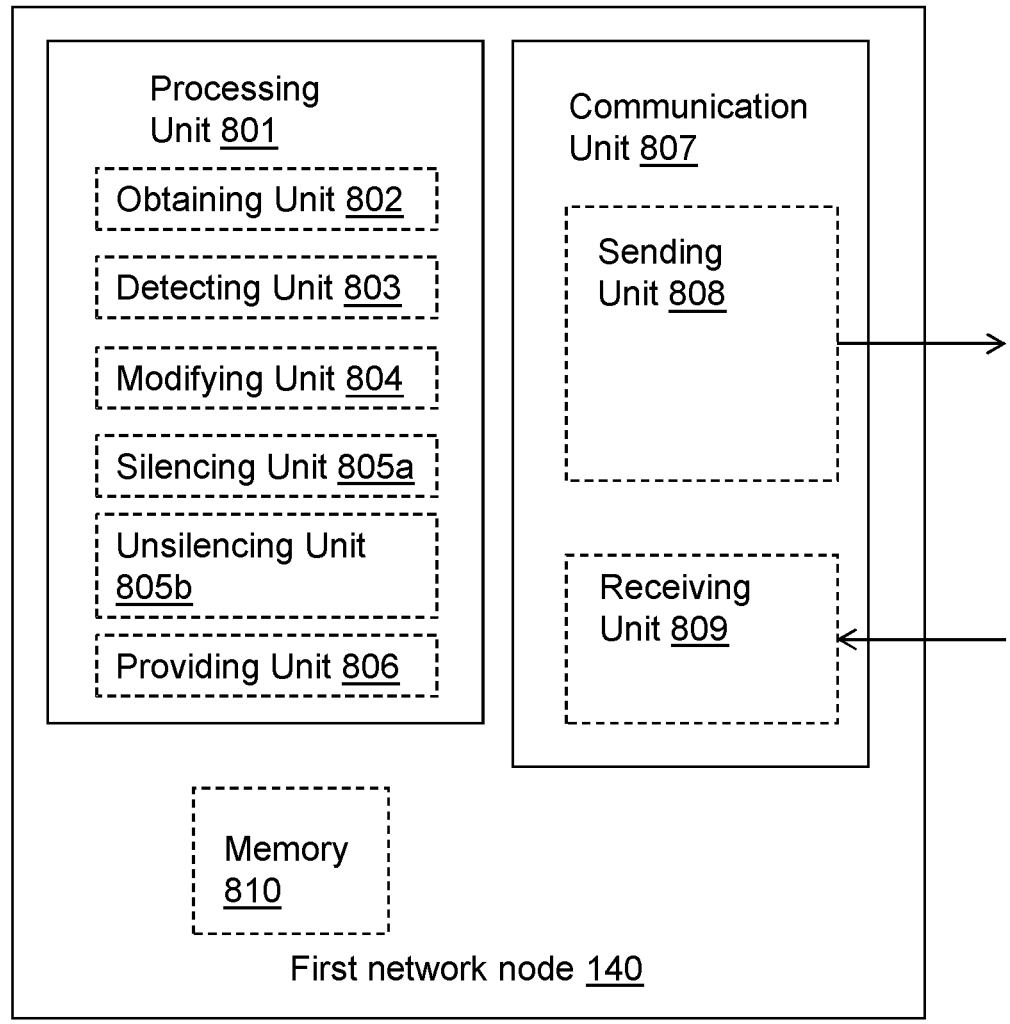
FIG. 9 is a schematic block diagram illustrating some first embodiments of the first network node.
Figure 9:
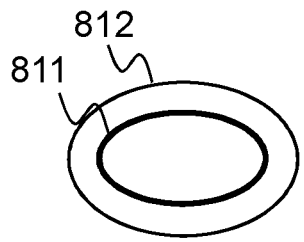

To perform the method actions for handling media channels during an ongoing media session, described above in relation to FIG. 6, the first network node 140 may comprise the following arrangement as depicted in FIG. 9. The first network node 140 may e.g. be an MF node. The first network node 140 may be arranged in the IMS domain.

The first network node 140 may comprise a processing unit 801, such as e.g. one or more processors, an obtaining unit 802, a detecting unit 803, a modifying unit 804, a silencing unit 805a, an unsilencing unit 805b, and a providing unit 806, as exemplifying hardware units configured to perform the methods described herein. The first network node 150 may further comprise a communication unit 807 for communicating with other network devices, such as e.g. the second network node 141, the third party network device 150 or the UEs 120, 121. The communication unit may comprise a sending unit 808 for sending information to network devices and a receiving unit 809 for receiving information from network devices.

The first network node 140 is configured to, e.g. by means of the processing unit 801 and/or the obtaining unit 802 and/or the receiving unit 809 being configured to, obtain, from the first UE 120, a voice instruction comprising a keyword for invoking a third party service within the media session.

The first network node 140 is configured to, e.g. by means of the processing unit 801 and/or the detecting unit 803 being configured to, detect the keyword for invoking the third party service within the media session.

The first network node 140 is configured to, e.g. by means of the processing unit 801 and/or the modifying unit 804 and/or the silencing unit 805b being configured to, modify, based on the detection of the keyword, the media channel between the first network node 140 and the second UE 121 to be silent.

The first network node 140 is further be configured to, e.g. by means of the processing unit 801 and/or the modifying unit 804 and/or the unsilencing unit 805b being configured to, modify, based on the detection of the keyword, a media channel between the first network node 140 and the third party network device 150 to be unsilent.

The first network node 140 may further be configured to, e.g. by means of the processing unit 801 and/or the providing unit 806 and/or the sending unit 808 being configured to, provide an indication that one or more services are requested from the third party network device 150, to the second network node 141.

The first network node 140 may further be configured to, e.g. by means of the processing unit 801 and/or the obtaining unit 802 and/or the receiving unit 809 being configured to, obtain a request to modify the media channel for the second UE 121, from the second network node 141 to be silent.

The first network node 140 may further be configured to, e.g. by means of the processing unit 801 and/or the providing unit 806 and/or the sending unit 808 being configured to, provide an indication that the media channel between the first network node 140 and the second UE 121 has been silenced, to the second network node 141.

The first network node 140 may further be configured to, e.g. by means of the processing unit 801 and/or the obtaining unit 802 and/or the receiving unit 809 being configured to, obtain a request to modify the media channel 150 between the first network node 140 and the third party network device 150 to be unsilent, from the second network node 141.

The first network node 140 may further be configured to, e.g. by means of the processing unit 801 and/or the obtaining unit 802 and/ or the receiving unit 809 being configured to, obtain an indication that the media channel between the first network node 140 and the third party network device 150 is to be modified to be silent.

The first network node 140 is configured to, e.g. by means of the processing unit 801 and/or the muting unit 804 and/or the activating unit 805 being configured to, modify, based on the obtained indication, the media channel between the first network node 140 and the third party network device 150 to be silent.

The first network node 140 is further be configured to, e.g. by means of the processing unit 801 and/or the modifying unit 804 and/or the muting unit 805a being configured to, modify, based on the obtained indication, the media channel between the first network node 140 and the second UE 121 to be silent.

The first network node 140 may further be configured to, e.g. by means of the processing unit 801 and/or the providing unit 806 and/or the sending unit 808 being configured to, provide the indication that the media channel between the first network node 140 and the third party network device 150 is to be modified to be silent, to the second network node 141.

The first network node 140 may further be configured to, e.g. by means of the processing unit 801 and/or the obtaining unit 802 and/or the receiving unit 809 being configured to, obtain, from the second network node 141, a request to modify the media channel between the first network node 140 and the third party network device 150 to be silent, and/or to modify the media channel 150 between the first network node 140 and the second UE 121 to be unsilent.

The first network node 150 may further comprise a memory 810. The memory 810 comprises one or more memory units to be used to store data on, such as system information, configurations and/or applications to perform the methods disclosed herein when being executed, and similar.

Those skilled in the art will also appreciate that the obtaining unit 802, the detecting unit 803, the modifying unit 804, the silencing unit 805a, the unsilencing unit 805b, and the providing unit 806, described above may refer to a combination of analog and digital circuits, and/or one or more processors configured with software and/or firmware, e.g. stored in the memory 808, that when executed by the one or more processors such as the processing unit 801 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein performed by the first network node 140 may be implemented through a respective processor or one or more processors, such as the processor 801 of a processing circuitry in the first network node 140 depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the first network node 140. One such carrier may be in the form of a CD ROM disc. It is however feasible with other data carriers such as a memory stick. The computer program code may furthermore be provided as pure program code on a server and downloaded to the first network node 140.

Figure 10:
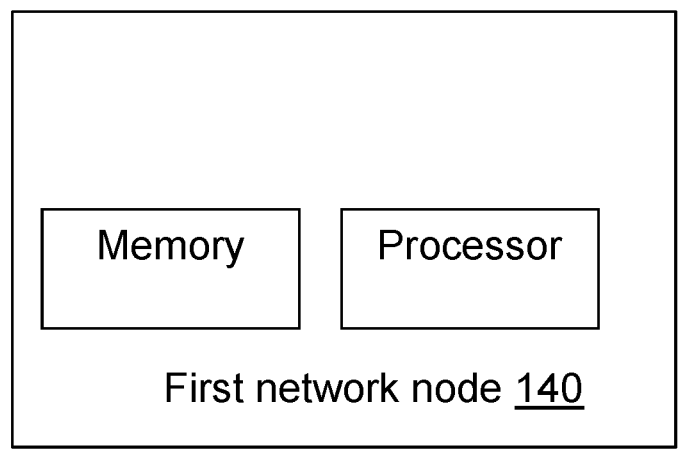
FIG. 10 is a schematic block diagram illustrating some second embodiments of the first network node.
Figure 10:
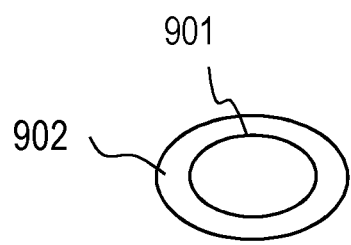

The embodiments herein for handling media channels during an ongoing media session may be implemented through a respective processor or one or more processors of a processing circuitry in the first network node 140 as depicted in FIG. 10, which processing circuitry is configured to perform the method actions according to FIG. 6, FIG. 7 and the embodiments described above for the first network node 140.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the first network node 140. One such carrier may be in the form of a CD ROM disc. It is however feasible with other data carriers such as e.g. a memory stick. The computer program code may furthermore be provided as pure program code on a server and downloaded to the first network node 140.

The first network node 140 may further comprise a memory. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the first network node 140 may be implemented by means of e.g. a computer program product 811, 901 or a computer program, comprising instructions, i.e., software code portions, which, when executed on at least one processor, cause at least one processor to carry out the actions described herein, as performed by the first network node 140. The computer program product 811, 901 may be stored on a computer-readable storage medium 812, 902, e.g. a disc or similar. The computer-readable storage medium 812, 902, having stored thereon the computer program, may comprise instructions which, when executed on at least one processor, cause the at least one processor to carry out the actions described herein, as performed by the first network node 140. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the first network node 140.

The first network node 140 described in the embodiments herein may also be implemented in a cloud. Although the method actions performed by the first network node 140 herein are discussed in the context of a core network node, the method may also be performed by a distributed node comprised in a first cloud, such as e.g. a server and/or a datacentre. The method actions may e.g. be performed by a logical function, which may be a centralized service hosted on the core network node or the distributed node.

Figure 11:
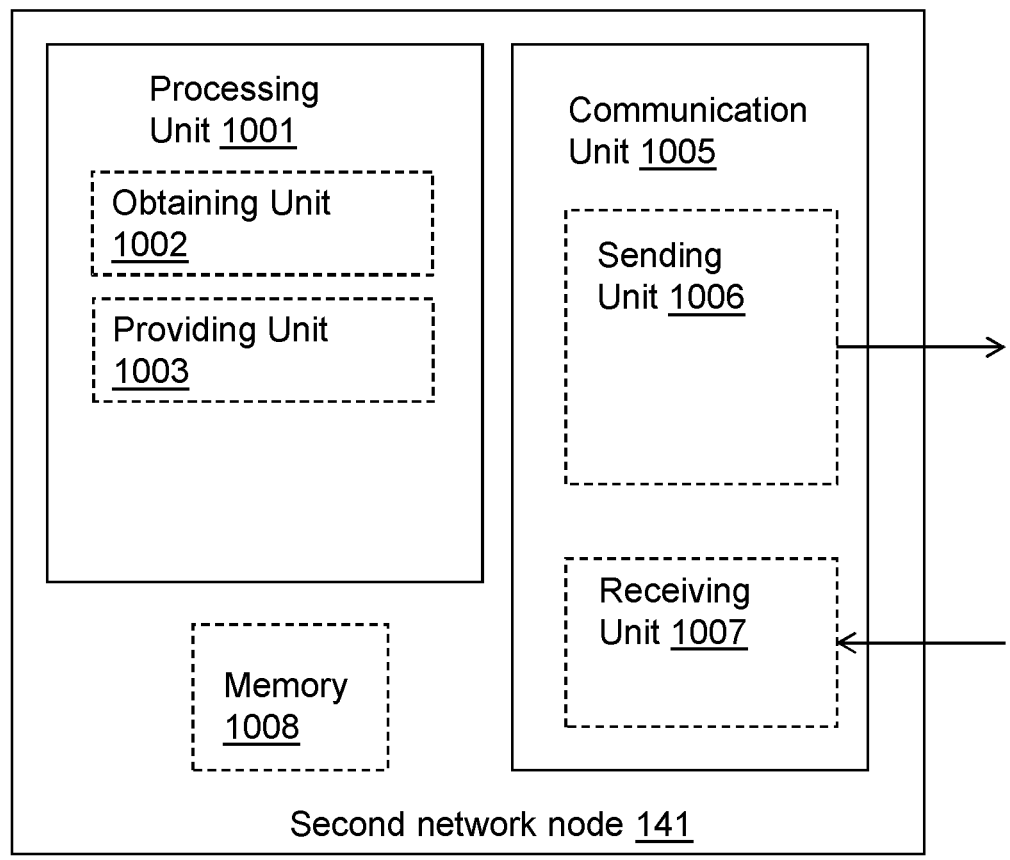
FIG. 11 is a schematic block diagram illustrating some first embodiments of the second network node.
Figure 11:
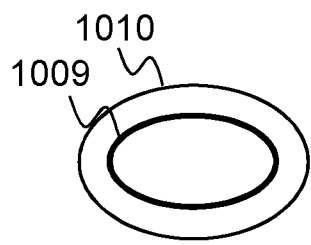

To perform the method actions for handling media channels during an ongoing media session, described above in relation to FIG. 8, the second network node 141 may comprise the following arrangement as depicted in FIG. 11. The ongoing media session is the session comprising the first UE 120, the second UE 121 and the first network node 140. The second network node 141 may e.g. be an AS node providing communication service towards the third party network device 150.

The second network node 141 may comprise a processing unit 1001, such as e.g. one or more processors, an obtaining unit 1002, and a providing unit 1003, as exemplifying hardware units configured to perform the methods described herein. The second network node 141 may further comprise a communication unit 1005 for communicating with other network devices, such as e.g. the first network node 140, the third party network device 150 and/or the first and the second UEs 120, 121. The communication unit may comprise a sending unit 1006 for sending information to network devices and a receiving unit 1007 for receiving information from network devices.

The second network node 141 is configured to, e.g. by means of the processing unit 1001 and/or the obtaining unit 1002 and/or the receiving unit 1007 being configured to, obtain an indication that one or more services are requested from the third party network device 150, from the first network node 140.

The second network node 141 is configured to, e.g. by means of the processing unit 1001 and/or the providing unit 1003 and/or the sending unit 1006 being configured to, provide a request to modify the media channel for the second UE 121 to be silent, to the first network node 140.

The second network node 141 may further be configured to, e.g. by means of the processing unit 1001 and/or the obtaining unit 1002 and/or the receiving unit 1007 being configured to, obtain an indication that the media channel between the first network node 140 and the second UE 121 has been silenced, from the first network node 140.

The second network node 141 may be configured to, e.g. by means of the processing unit 1001 and/or the providing unit 1003 and/or the sending unit 1006 being configured to, provide a request to modify the media channel 150 between the first network node 140 and the third party network device 150 to be unsilent, to the first network node 140.

The second network node 141 may be configured to, e.g. by means of the processing unit 1001 and/or the obtaining unit 1002 and/or the receiving unit 1007 being configured to, obtain the indication that the media channel between the first network node 140 and the third party network device 150 is to be modified to be silent, from the first network node 140.

The second network node 141 may be configured to, e.g. by means of the processing unit 1001 and/or the providing unit 1003 and/or the sending unit 1006 being configured to, provide a request to modify the media channel between the first network node 140 and the third party network device 150 to be silent, and/or to modify the media channel 150 between the first network node 140 and the second UE 121, to the first network node 140 to be unsilent.

The second network node 151 may further comprise a memory 1008. The memory 1008 comprises one or more memory units to be used to store data on, such as system information, configurations and/or applications to perform the methods disclosed herein when being executed, and similar.

Those skilled in the art will also appreciate that the obtaining unit 1002 described above may refer to a combination of analog and digital circuits, and/or one or more processors configured with software and/or firmware, e.g. stored in the memory 1008, that when executed by the one or more processors such as the processing unit 1001 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein performed by the second network node 141 may be implemented through a respective processor or one or more processors, such as the processor 1001 of a processing circuitry in the second network node 141 depicted in FIG. 10, together with respective computer program code for performing the functions and actions of the embodiments herein. The program code mentioned above may also be provided as a computer program product, for instance in the form of a data carrier carrying computer program code for performing the embodiments herein when being loaded into the second network node 141. One such carrier may be in the form of a CD ROM disc. It is however feasible with other data carriers such as a memory stick. The computer program code may furthermore be provided as pure program code on a server and downloaded to the second network node 141.

Figure 12:
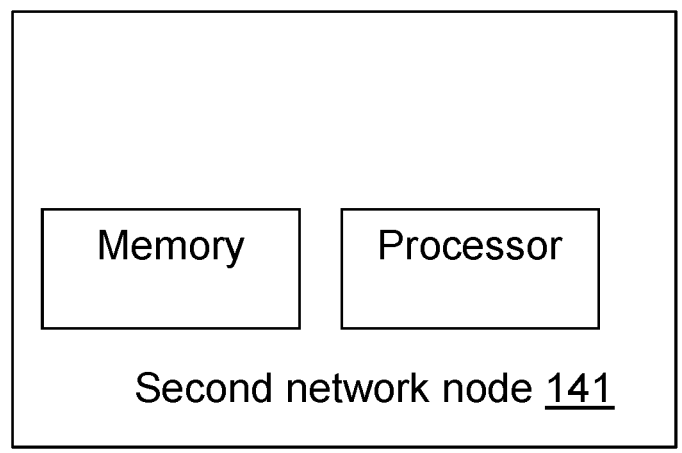
FIG. 12 is a schematic block diagram illustrating some second embodiments of the second network node.
Figure 12:
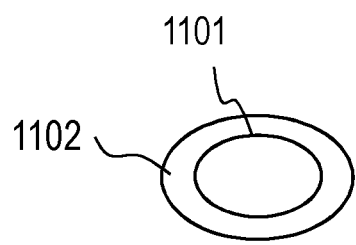

The embodiments herein for handling media channels during an ongoing media session may be implemented through a respective processor or one or more processors of a processing circuitry in the second network node 141 as depicted in FIG. 12, which processing circuitry is configured to perform the method actions according to FIG. 8 and the embodiments described above for the second network node 141.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the second network node 141. One such carrier may be in the form of a CD ROM disc. It is however feasible with other data carriers such as e.g. a memory stick. The computer program code may furthermore be provided as pure program code on a server and downloaded to the second network node 141.

The second network node 141 may further comprise a memory. The memory may comprise one or more memory units to be used to store data on, such as the list of one or more ongoing call sessions for the first user, software, patches, system information (SI), configurations, diagnostic data, performance data and/or applications to perform the methods disclosed herein when being executed, and similar.

The method according to the embodiments described herein for the second network node 151 may be implemented by means of e.g. a computer program product 1009, 1101 or a computer program, comprising instructions, i.e., software code portions, which, when executed on at least one processor, cause at least one processor to carry out the actions described herein, as performed by the second network node 141. The computer program product 1009, 1101 may be stored on a computer-readable storage medium 1010, 1102, e.g. a disc or similar. The computer-readable storage medium 1010, 1102, having stored thereon the computer program, may comprise instructions which, when executed on at least one processor, cause the at least one processor to carry out the actions described herein, as performed by the second network node 141. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the second network node 141.

The second network node 141 described in the embodiments herein may also be implemented in a cloud. The method actions performed by the second network node 141 herein may be performed by a core network node, or a distributed node comprised in a first cloud, such as e.g. a server and/or a datacenter. The method actions may e.g. be performed by a logical function, which may be a centralized service hosted on the core network node or the distributed node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

When using the word "comprise" or "comprising" it shall be interpreted as non-limiting, i.e. meaning "consist at least of".

Further Extensions and Variations

Figure 13:
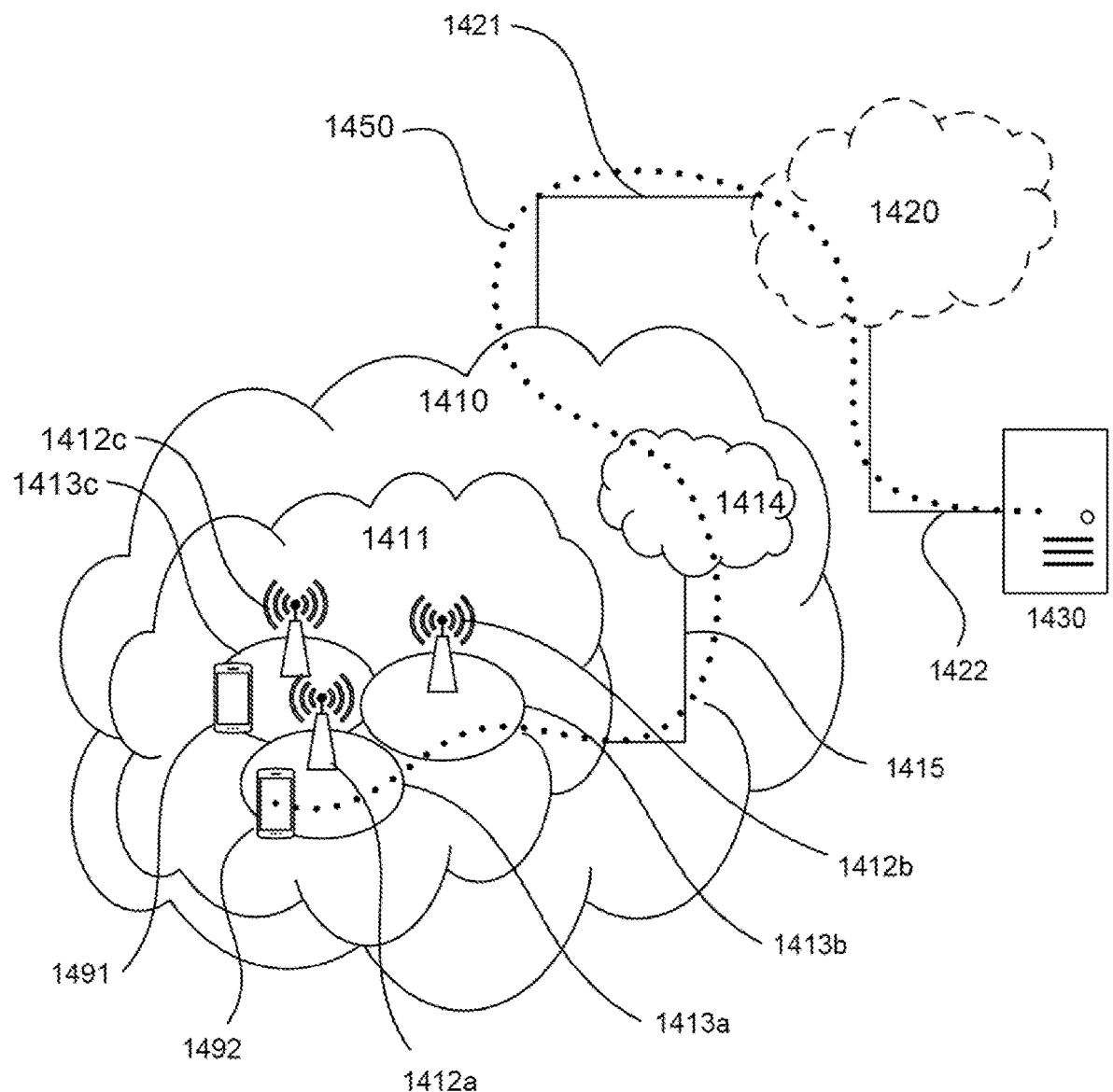
FIG. 13 is a schematic block diagram illustrating a host computer communicating via a base station with a user equipment over a partially wireless connection in accordance with some embodiments.

With reference to FIG. 13, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, e.g. the network node 110, 111, such as NBs, eNBs, gNBs or other types of wireless access points, each defining a corresponding coverage area 1413a, 1413b, 1413c, such as e.g. the cells 130, 131. Each base station 1412a, 1412b, 1412c is connectable to core network 1414 over a wired or wireless connection 1415. A first UE 1491, such as the UE 120, located in coverage area 1413c is configured to wirelessly connect to, or be paged by, the corresponding base station 1412c. A second UE 1492, such as the UE 121, in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430, such as e.g. the third party network device 150, may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 13 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink (UL) and downlink (DL) communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 14. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512, such as e.g. the DA platform. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 14) served by base station 1520. Communication interface 1526 may be configured to facilitate connection 1560 to host computer 1510. Connection 1560 may be direct or it may pass through a core network (not shown in FIG. 14) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

Figure 14:
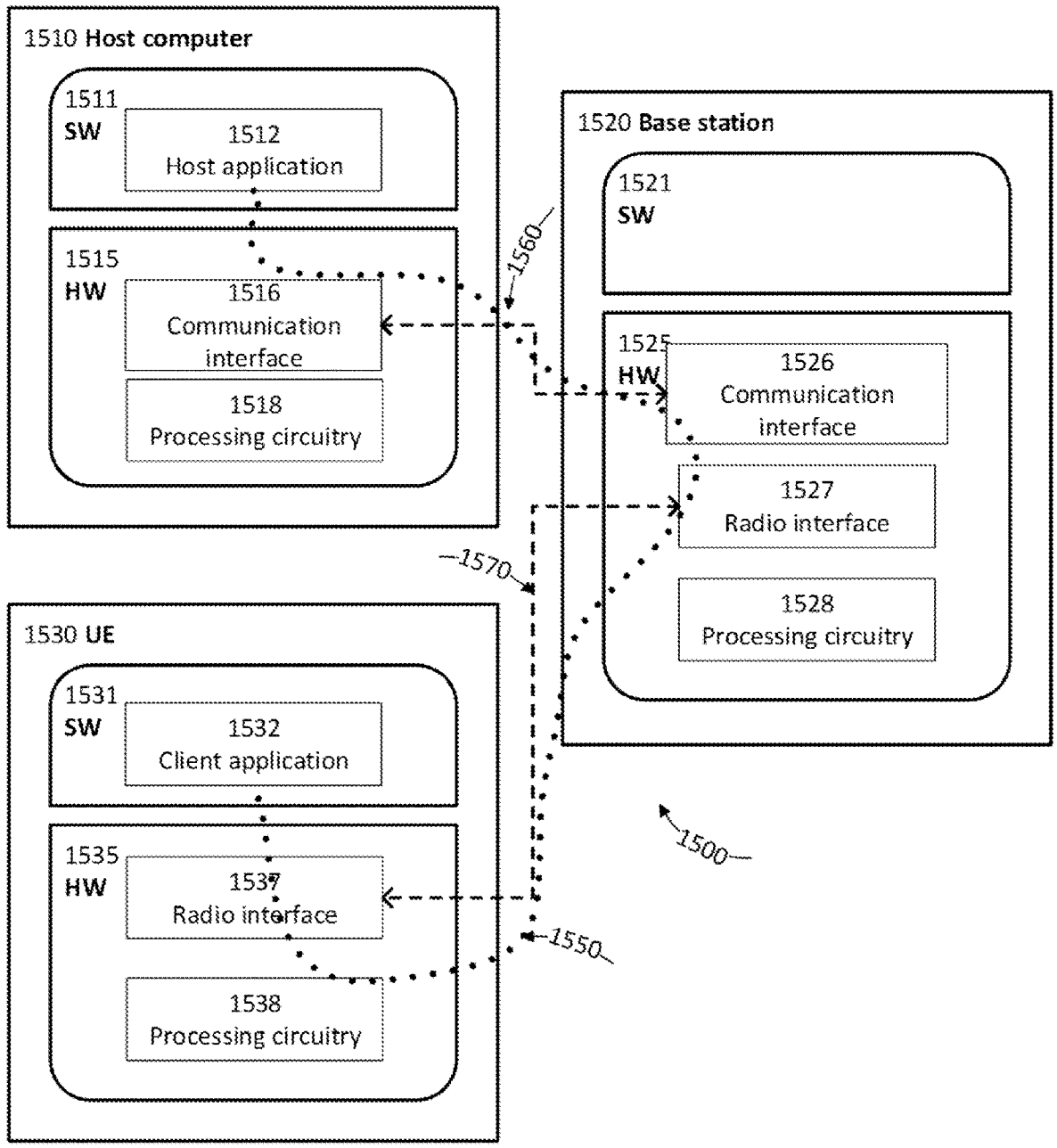
FIG. 14 is a schematic overview of a host computer communicating via a base station with a user equipment over a partially wireless connection in accordance with some embodiments.

It is noted that host computer 1510, base station 1520 and UE 1530 illustrated in FIG. 14 may be similar or identical to host computer 1430, one of base stations 1412*a*, 1412*b*, 1412*c* and one of UEs 1491, 1492 of FIG. 13, respectively. This is to say, the inner workings of these entities may be as shown in FIG. 14 and independently, the surrounding network topology may be that of FIG. 13.

In FIG. 14, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, muting the media channel to the second user when the media channel to the third party service is active and/or unmuted and muting the media channel to the third party service when the media channel to the second user is active and/or unmuted, it is ensured that the customer context, such as e.g. the voice of the first and/or the second user, is not shared with the third party OTT service. The teachings of these embodiments may thereby improve security and privacy as the service provided by a trusted operator entity ensures no sharing of information to the OTT application.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figures 15, 16:
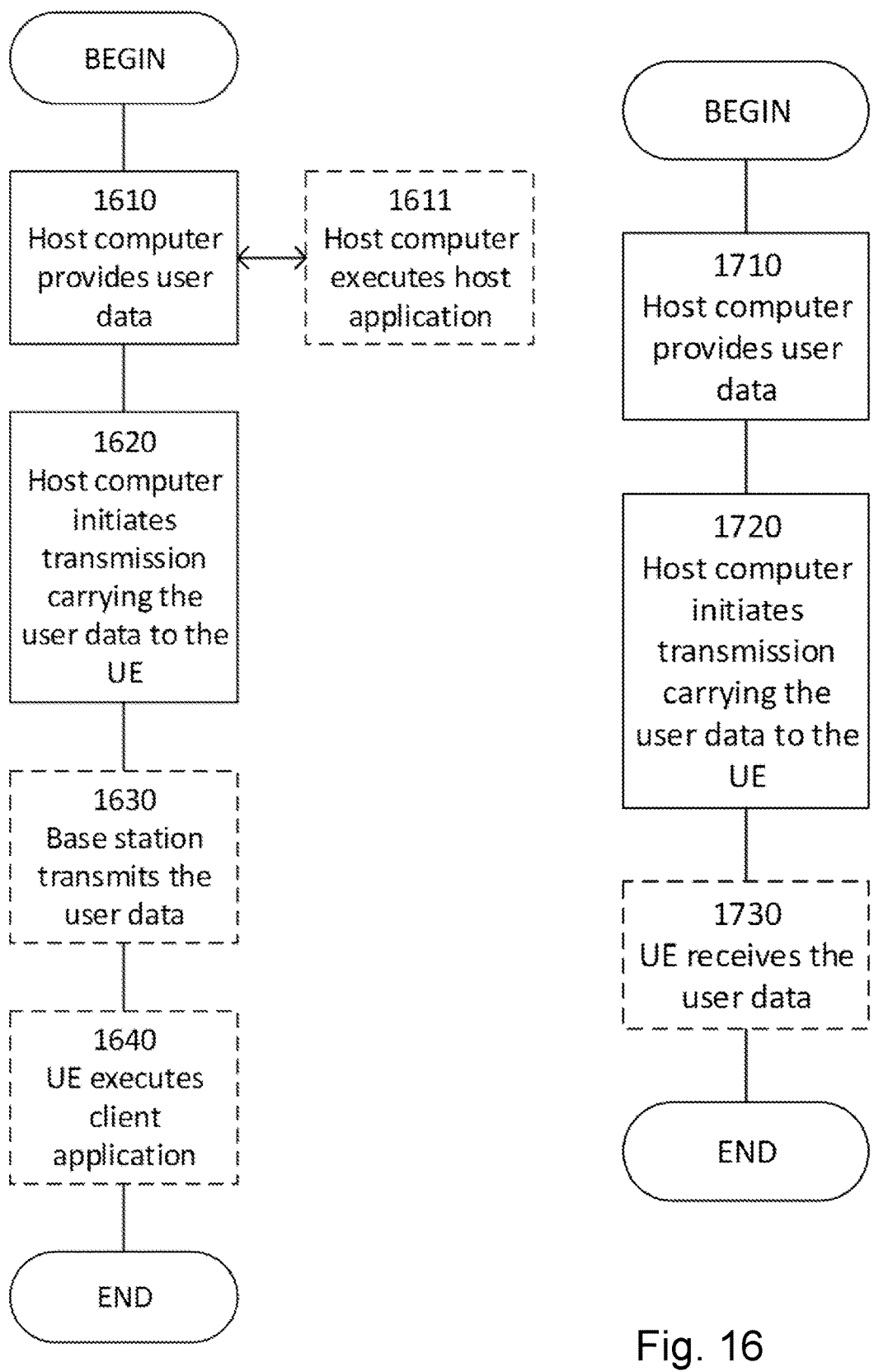
FIG. 15 is a flowchart depicting methods implemented in a communication system including a host computer, a base station and a user equipment in accordance with some embodiments.
FIG. 16 is a flowchart depicting methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a first network node in a wireless communications network, for handling media channels during an ongoing media session comprising a first user equipment (UE), a second UE, and the first network node, the method comprising:

obtaining, from the first UE, a voice instruction comprising a keyword for invoking a third party service within the media session, detecting the keyword for invoking the third party service within the media session, based on the detection of the keyword, modifying a media channel between the first network node and the second UE to be unsilent, and based on the detection of the keyword, modifying a media channel between the first network node and a third party network device to be silent.

2. The method according to claim 1, further comprising:
providing, to a second network node, an indication that one or more services are requested from the third party network device, obtaining, from the second network node, a request to mute the media channel for the second UE.

3. The method according to claim 2, further comprising:
providing, to the second network node, an indication that the media channel between the first network node and the second UE has been silenced, and obtaining, from the second network node, a request to modify the media channel between the first network node and the third party network device to be unsilent.

4. The method according to claim 1, further comprising:
obtaining an indication that the media channel between the first network node and the third party network device is to be modified to be unsilent, modifying, based on the obtained indication, the media channel between the first network node and the third party network device to be silent, and modifying, based on the obtained indication, the media channel between the first network node and the second UE to be unsilent.

5. The method according to claim 4, further comprising:
providing, to the second network node, the indication that the media channel between the first network node and the third party network device is to be modified to be silent, and obtaining, from the second network node, a request to modify the media channel between the first network node and the third party network device to be silent, and/or to modify the media channel between the first network node and the second UE to be unsilent.

6. The method according to claim 1, wherein one or more of the following applies:

the first network node is a Media Function (MF) node;
the second network node is an Application Server (AS) node providing communication service towards the third party network device; and
the third party network device is a digital assistant.

7. A first network node in a wireless communications network, the first network node being configured to handle media channels during an ongoing media session comprising a first user equipment (UE), a second UE and the first network node, the first network node comprising:

one or more processors; and
a computer-readable storage medium storing computer-executable instructions that, when executed by the one or more processors, cause the first network node to:
obtain, from the first UE, a voice instruction comprising a keyword for invoking a third party service within the media session, detect the keyword for invoking the third party service within the media session, modify, based on the detection of the keyword, a media channel between the first network node and the second UE to be silent, and modify, based on the detection of the keyword, a media channel between the first network node and a third party network device to be unsilent.

8. The first network node according to claim 7, wherein execution of the instructions by the one or more processors further causes the first network node to:

provide, to a second network node, an indication that one or more services are requested from the third party network device, and obtain, from the second network node, a request to modify the media channel for the second UE to be silent.

9. The first network node according to claim 8, wherein execution of the instructions by the one or more processors further causes the first network node to:

provide, to the second network node, an indication that the media channel between the first network node and the second UE has been silenced, and obtain, from the second network node, a request to modify the media channel between the first network node and the third party network device to be unsilent.

10. The first network node according to claim 7, wherein execution of the instructions by the one or more processors further causes the first network node to:

obtain an indication that the media channel between the first network node and the third party network device is to be modified to be silent, modify, based on the obtained indication, the media channel between the first network node and the third party network device to be silent, and modify, based on the obtained indication, the media channel between the first network node and the second UE to be unsilent.

11. The first network node according to claim 10, wherein execution of the instructions by the one or more processors further causes the first network node to:

provide, to the second network node, the indication that the media channel between the first network node and the third party network device is to be modified to be silent, and obtain, from the second network node, a request to modify the media channel between the first network node and the third party network device to be silent, and/or to modify the media channel between the first network node and the second UE to be unsilent.

12. The first network node according to claim 7, wherein one or more of the following applies:

the first network node is a Media Function (MF) node;
the second network node is an Application Server (AS) node providing communication service towards the third party network device; and
the third party network device is a digital assistant.

13. A non-transitory, computer-readable medium storing computer-executable instructions that, when executed by one or more processors associated with a first network node in a wireless communications network, cause the first network node to perform operations corresponding to the method of claim 1.

* * * * *